United States Patent
Tanabe et al.

(10) Patent No.: US 8,208,921 B2
(45) Date of Patent: Jun. 26, 2012

(54) MOBILE COMMUNICATION METHOD AND MOBILE STATION

(75) Inventors: Akimichi Tanabe, Kawasaki (JP); Itsuma Tanaka, Yokohama (JP); Keisuke Suzuki, Yokosuka (JP); Masashi Kanauchi, Yokosuka (JP)

(73) Assignee: NTT DoCoMo, Inc., Tokyo (JP)

( * ) Notice: Subject to any disclaimer, the term of this patent is extended or adjusted under 35 U.S.C. 154(b) by 0 days.

(21) Appl. No.: 13/001,112

(22) PCT Filed: Jun. 22, 2009

(86) PCT No.: PCT/JP2009/061280
§ 371 (c)(1),
(2), (4) Date: Apr. 1, 2011

(87) PCT Pub. No.: WO2009/157394
PCT Pub. Date: Dec. 30, 2009

(65) Prior Publication Data
US 2011/0177812 A1      Jul. 21, 2011

(30) Foreign Application Priority Data
Jun. 24, 2008   (JP) ................ 2008-165154

(51) Int. Cl.
*H04Q 7/20* (2006.01)
(52) U.S. Cl. ............... 455/435.1; 455/550.1; 455/436; 370/328
(58) Field of Classification Search .............. 455/435.1, 455/550.1, 436; 370/328
See application file for complete search history.

(56) References Cited

U.S. PATENT DOCUMENTS

| | | | |
|---|---|---|---|
| 2003/0050078 A1* | 3/2003 | Motegi et al. | 455/456 |
| 2004/0053626 A1* | 3/2004 | Yagi | 455/456.1 |
| 2004/0166836 A1* | 8/2004 | Kadowaki | 455/417 |
| 2005/0186961 A1* | 8/2005 | Aikawa et al. | 455/435.1 |
| 2006/0154670 A1* | 7/2006 | Miyabayashi et al. | 455/450 |
| 2007/0165803 A1 | 7/2007 | Duan | |
| 2010/0105385 A1 | 4/2010 | Tanabe et al. | |

FOREIGN PATENT DOCUMENTS

WO   2006012798 A1   2/2006
WO   2008114823 A1   9/2008

OTHER PUBLICATIONS

International Search Report issued in PCT/JP2009/061280, mailed on Sep. 29, 2009 (2 pages).
Ericsson, Handover Restriction in eNodeB, 3GPP TSG SA WG2 Meeting #63, S2-081776, 3GPP, Feb. 22, 2008, p. 1-43.
3GPP TS 23.401 V8.2.0 (Jun. 2008) 3rd Generation Partnership Project; Technical Specification Group Services and System Aspects; General Packet Radio Services (GPRS) Enhancements for Evolved Universal Terrestrial Radio Access Network (E-UTRAN) access (Release 8). 3GPP TS 23.401 V8.5.0 (Mar. 2009) 3rd Generation Partnership Project; Technical Specification Group Services and System Aspects; General Packet Radio Services (GPRS) Enhancements for Evolved Universal Terrestrial Radio Access Network (E-UTRAN) access (Release 8).
Written Opinion issued in PCT/JP2009/061280, mailed on Sep. 29, 2009, 3 pages.

* cited by examiner

*Primary Examiner* — Danh Le
(74) *Attorney, Agent, or Firm* — Osha Liang LLP (57) ABSTRACT

In a mobile communication method, when a mobile station UE has moved from an area inside UTRAN to an area inside E-UTRAN, a connection process with "Default APN" is executed if no connection with the "Default APN" is established even if it is determined that no position registration process need to be executed for the E-UTRAN.

6 Claims, 7 Drawing Sheets

MOBILE COMMUNICATION METHOD AND MOBILE STATION

TECHNICAL FIELD

The present invention relates to a mobile communication method by which, when moving to a first area in a first network from a second area in a second network, a mobile station determines whether or not a location registration process to the first network needs to be executed, depending on whether or not the mobile station manages information on the first area, and also relates to the mobile station.

BACKGROUND OF THE INVENTION

In an "E-UTRAN (Evolved-Universal Terrestrial Radio Access Network)/EPC (Evolved Packet Core)" mobile communication system defined by 3GPP, a mobile station UE is configured to connect with a "Default APN (Access Point Name)" specified by a network during an Attach process.

Figure 5:
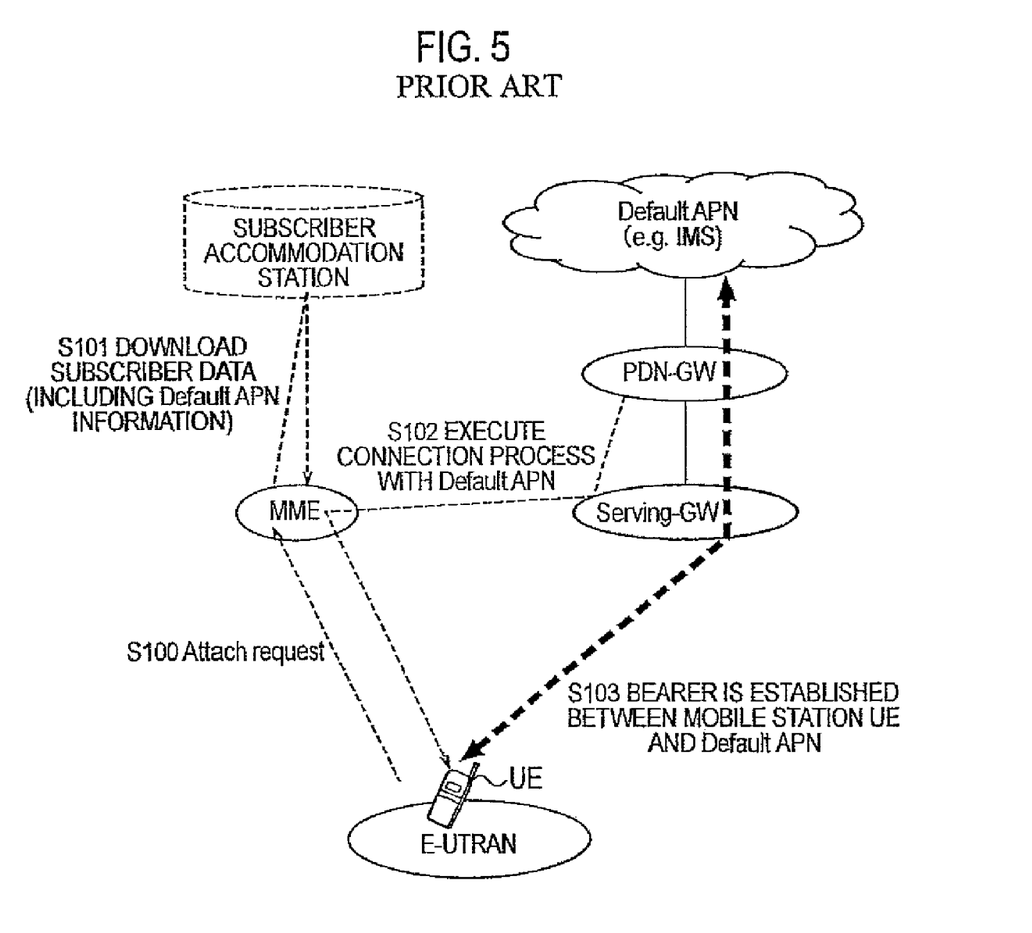
FIG. 5 is a diagram for explaining operations of a conventional mobile communication system.

To be more specific, as shown in FIG. 5, after initiating the Attach process within an area in the E-UTRAN, the mobile station UE transmits an "Attach request (Attach request)" to an E-UTRAN packet exchange MME in Step S100.

In Step S101, the exchange MME downloads subscriber data (including Default APN information) on the mobile station UE from a subscriber accommodation station.

In Step S102, the mobile station UE executes a connection process with the "Default APN (e.g., IMS (IP Multimedia Subsystem))" in response to an instruction from the exchange MME.

In Step S103, a bearer is established between the mobile station UE and the "Default APN."

The mobile station UE is configured to execute a location registration process to the E-UTRAN or UTRAN, when moving between an area in the E-UTRAN and an area in UTRAN (Universal Terrestrial Radio Access Network).

Figure 6:
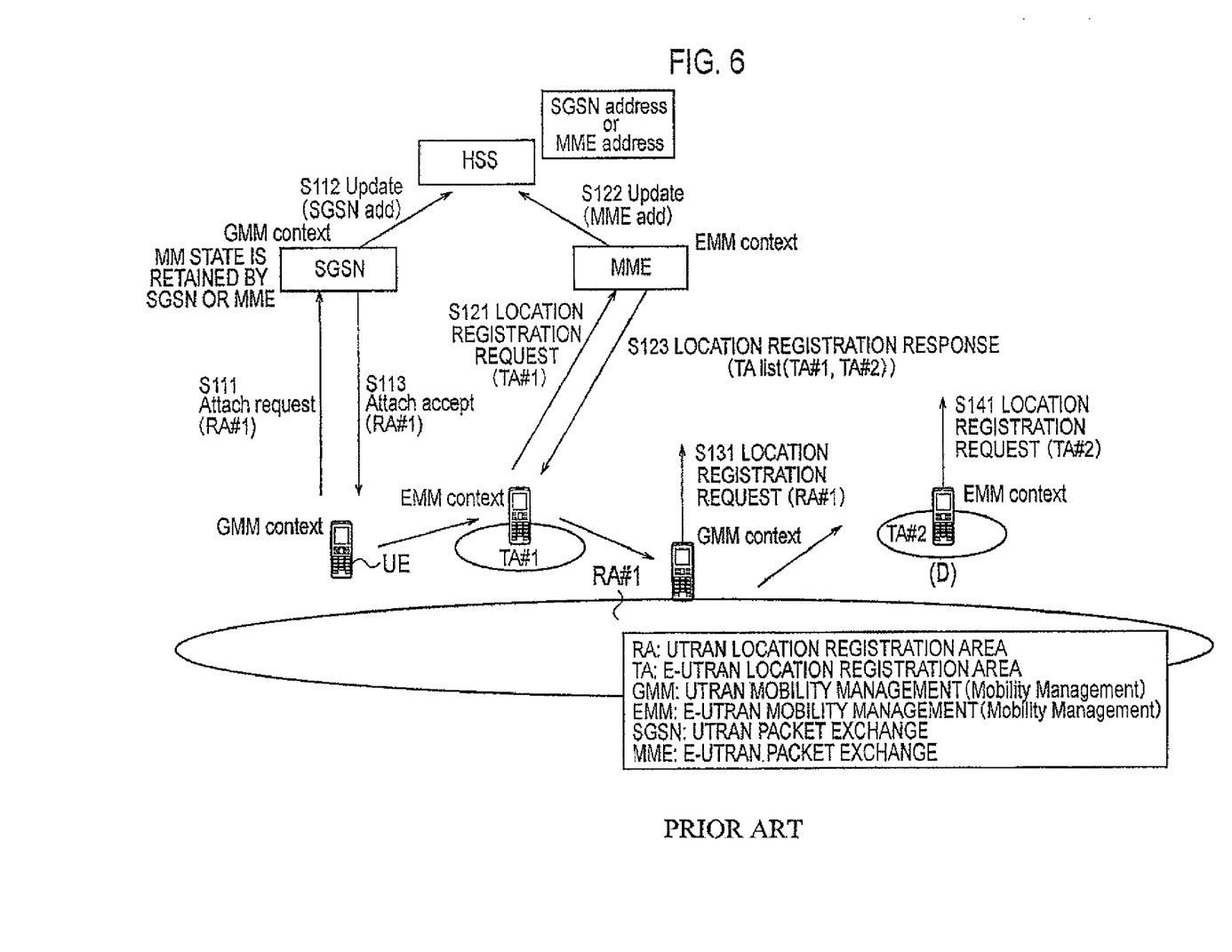
FIG. 6 is a diagram for explaining operations of the conventional mobile communication system.

To be more specific, as shown in FIG. 6, in Step S111, the mobile station UE in a UTRAN location registration area RA#1 (state (A)) transmits an "Attach request (RA#1)" to a UTRAN packet exchange SGSN.

The UTRAN packet exchange SGSN instructs a subscriber database HSS (Home Subscriber Server) to update location registration information on the mobile station UE in Step S112, and then transmits an "Attach accept (including information on RA#1)" to the mobile station UE in Step S113.

Here, a "GMM context" that is a UE context of the mobile station UE in the UTRAN is retained by both the mobile station UE and the UTRAN packet exchange SGSN.

Upon detection of its movement from the UTRAN location registration area RA#1 to an E-UTRAN location registration area TA#1 (state (B)), the mobile station UE transmits a location registration request (TA#1) to the E-UTRAN to the E-UTRAN packet exchange MME in Step S121.

The E-UTRAN packet exchange MME instructs the subscriber database HSS to update the location registration information on the mobile station UE in Step S122, and then transmits a "location registration response (including a TA list with information on TA#1 and TA#2)" to the mobile station UE in Step S123.

Here, in the mobile station UE, the "GMM context" described above is deleted, and an "EMM context" that is a UE context of the mobile station UE in the E-UTRAN is retained instead. Note that the "EMM context" is also retained by the E-UTRAN packet exchange MME.

Thereafter, upon detection of its movement from the E-UTRAN location registration area TA#1 to an UTRAN location registration area RA#1 (state (C)), the mobile station UE transmits a location registration request (RA#1) to the UTRAN to the UTRAN packet exchange SGSN in Step S131.

In addition, upon detection of its movement from the UTRAN location registration area RA#1 to an E-UTRAN location registration area TA#2 (state (D)), the mobile station UE transmits a location registration request (TA#2) to the E-UTRAN to the E-UTRAN packet exchange MME in Step S141.

Figure 7:
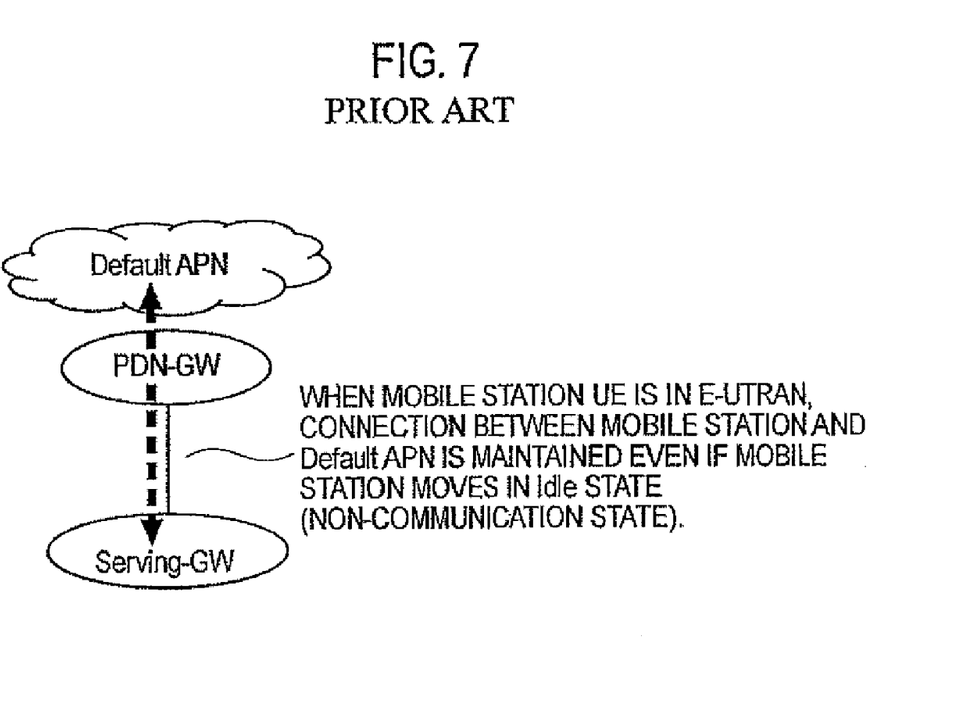
FIG. 7 is a diagram for explaining operations of the conventional mobile communication system.

Generally, as shown in FIG. 7, the mobile communication system described above is configured so that when the mobile station UE is in the E-UTRAN location registration area, the connection between the mobile station UE and the "Default APN" (more specifically, a connection for the mobile station UE between the "Default APN" and a "Serving-GW") is maintained even if an RRC connection with a radio base station eNB is shifted to an Idle state (non-communication state).

However, the number of foreign networks (APNs) that one mobile station UE can access simultaneously in the UTRAN is smaller than that in the E-UTRAN. This leads to a case where the connection between the mobile station UE and the "Default APN" is cut off while the mobile station UE is within the area in the UTRAN.

As a measure against such a case, 3GPP defines a method for encouraging the mobile station UE to execute a connection process with the "Default APN" when the mobile station UE moves back to the area in the E-UTRAN from the area in the UTRAN.

Figure 8:
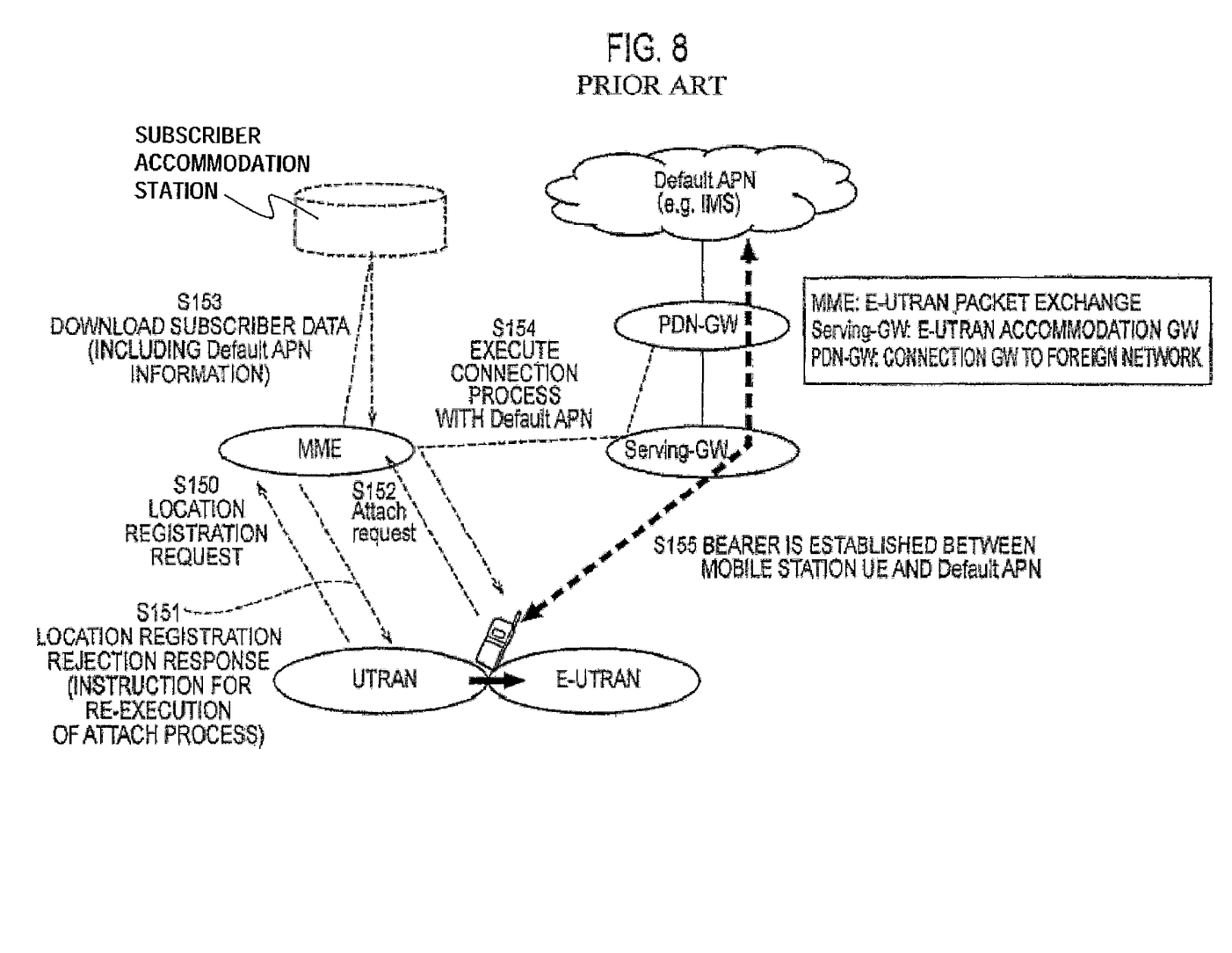
FIG. 8 is a diagram for explaining operations of the conventional mobile communication system.

To be more specific, as shown in FIG. 8, when the mobile station UE moves back to the area in the E-UTRAN from the area in the UTRAN, the mobile station UE transmits a location registration request to the E-UTRAN packet exchange MME in Step S150, and receives a location registration rejection response from the E-UTRAN packet exchange MME in Step S151. Specifically, the location registration rejection response instructs the mobile station UE to re-execute the Attach process.

In Step S152, the mobile station UE transmits an "Attach request" to the E-UTRAN packet exchange MME.

In Step S153, the exchange MME downloads subscriber data (including Default APN information) on the mobile station UE from a subscriber accommodation station.

In Step S154, the mobile station UE executes a connection process with the "Default APN (e.g., IMS (IP Multimedia Subsystem))" in response to an instruction from the exchange MME.

In Step S155, a bearer is established between the mobile station UE and the "Default APN."

For the mobile communication system described above, a technique called "ISR (Idle Mode Signaling Reduction)" is defined.

In the mobile communication system using "ISR," the mobile station UE does not have to execute a location registration process even when moving between the area in the UTRAN and the area in the E-UTRAN, thus enabling reduction in signals required for the location registration process.

Figure 9:
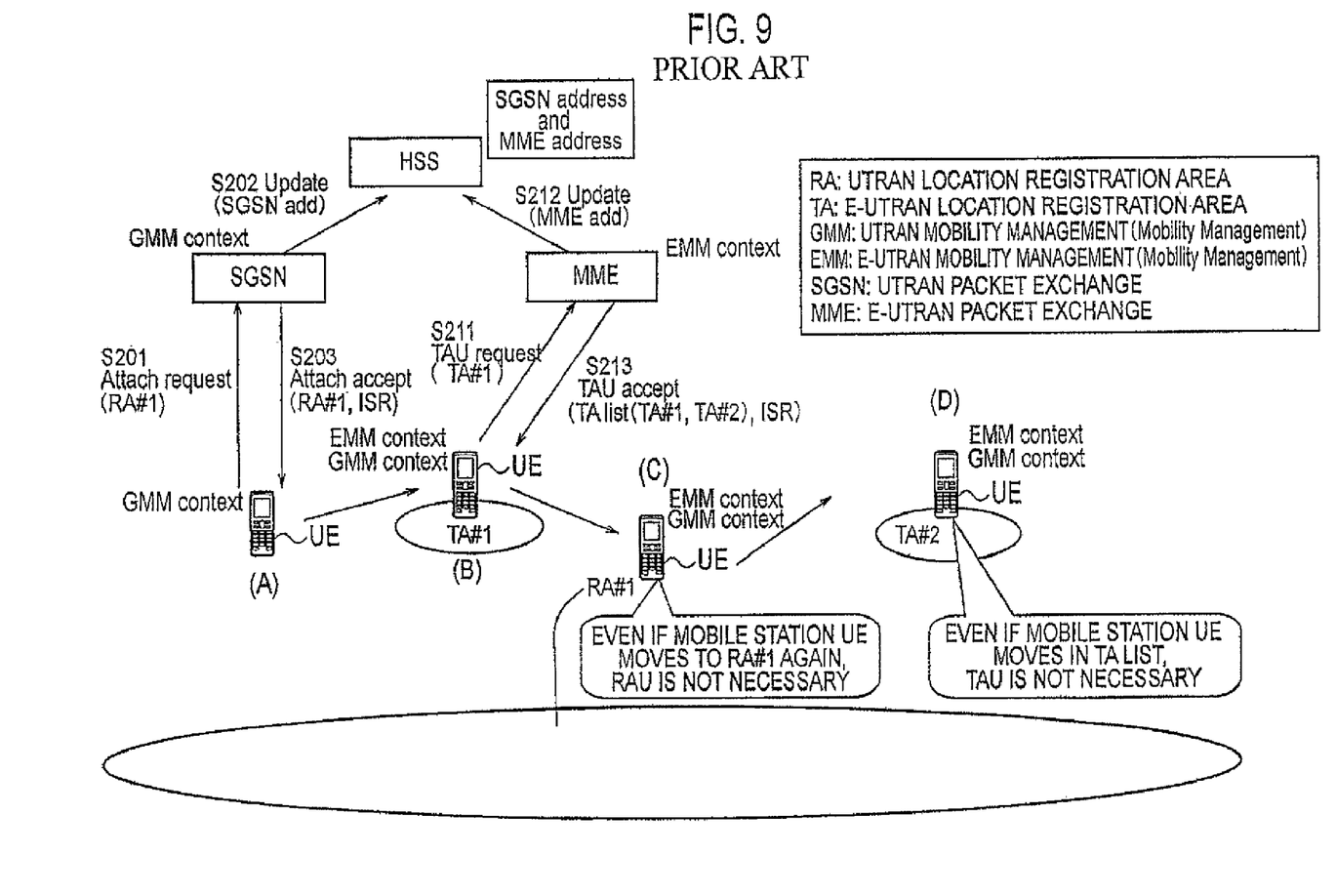
FIG. 9 is a diagram for explaining operations of the conventional mobile communication system.

To be more specific, as shown in FIG. 9, in Step S201, the mobile station UE in a UTRAN location registration area RA#1 (state (A)) transmits an "Attach request (RA#1)" to a UTRAN packet exchange SGSN.

The UTRAN packet exchange SGSN instructs a subscriber database HSS to update location registration information on the mobile station UE in Step S202, and then transmits an "Attach accept (including information on RA#1 and information indicating use of ISR)" to the mobile station UE in Step S203.

Here, a "GMM context" that is a UE context of the mobile station UE in the UTRAN is retained by both the mobile station UE and the UTRAN packet exchange SGSN.

Upon detection of its movement from the UTRAN location registration area RA#1 to an E-UTRAN location registration area TA#1 (state (B)), the mobile station UE transmits a location registration request (TA#1) to the E-UTRAN to the E-UTRAN packet exchange MME in Step S211.

The E-UTRAN packet exchange MME instructs the subscriber database HSS to update the location registration information on the mobile station UE in Step S212, and then transmits a "location registration response (including a TA list with information on TA#1 and TA#2)" to the mobile station UE in Step S213.

Here, the mobile station UE does not delete the "GMM context" described above, but retains it together with the "EMM context." Note that the "EMM context" is also retained by the E-UTRAN packet exchange MME.

Thereafter, even when detecting its movement from the E-UTRAN location registration area TA#1 to the UTRAN location registration area RA#1 (state (C)), the mobile station UE does not transmit a location registration request (RA#1) to the UTRAN to the UTRAN packet exchange SGSN since it retains the "GMM context."

Also when detecting its movement from the UTRAN location registration area RA#1 to the E-UTRAN location registration area TA#2 (state (D)), the mobile station UE does not transmit a location registration request (TA#2) to the E-UTRAN to the E-UTRAN packet exchange MME since the movement is between the TAs in the TA list and the mobile station UE retains the "EMM context."

SUMMARY OF THE INVENTION

Problems to be Solved by the Present Invention

However, the mobile communication system using "ISR" has the following problem. Specifically, in the case where the connection between the mobile station UE and the "Default APN" is cut off while the mobile station UE is within the area in the UTRAN, there is no trigger that causes the mobile station UE to execute a connection process with the "Default APN" when the mobile station UE moves back to the area in the E-UTRAN from the area in the UTRAN.

The E-UTRAN is designed on the assumption that the mobile station UE is always connected to the "Default APN." This leads to a problem that the mobile station UE cannot receive incoming signals from the "Default APN" when it is not connected to the "Default APN."

Therefore, the present invention has been made in view of the foregoing problems. It is an objective of the present invention to provide a mobile communication method and a mobile station by which, in the case of using "ISR," the mobile station UE is enabled to execute a connection process with the "Default APN" when the mobile station UE moves back to an area in E-UTRAN from an area in the UTRAN and even when a connection between the mobile station UE and the "Default APN" is cut off while the mobile station UE is within the area in the UTRAN.

A first aspect of the present invention is summarized as a mobile communication method by which, when moving to a first area in a first network from a second area in a second network, a mobile station determines whether or not a location registration process to the first network needs to be executed depending on whether or not the mobile station manages information on the first area, the method comprising the step of executing a connection process with a certain foreign network by the mobile station, when the mobile station moves to the first area from the second area, and when the mobile station determines that no connection with the certain foreign network is established even if determining that no location registration process to the first network needs to be executed.

In the first aspect, wherein the mobile station acquires and retains information on the certain foreign network during an Attach process to the first network, and the mobile station determines whether or not there is a connection with the certain foreign network by referring to the information on the certain foreign network.

In the first aspect, wherein the information on the certain foreign network includes identification information on each carrier and identification information on each foreign network.

A second aspect of the present invention is summarized as a mobile station configured to determine, when moving to a first area in a first network from a second area in a second network, whether or not a location registration process to the first network needs to be executed depending on whether or not the mobile station manages information on the first area, the mobile station comprise a connection processing unit configured to execute a connection process with a certain foreign network when the mobile station moves to the first area from the second area and when the mobile station determines that no connection with the certain foreign network is established even if determining that no location registration process to the first network needs to be executed.

In the second aspect, further comprise an Attach processing unit configured to acquire information on the certain foreign network during an Attach process to the first network, and to retain the acquired information in a storage unit, wherein the connection processing unit determines whether or not there is a connection with the certain foreign network by referring to the information on the certain foreign network in the storage unit.

In the second aspect, wherein the information on the certain foreign network includes identification information on each carrier and identification information on each foreign network.

Effect of the Invention

As described above, the present invention can provide a mobile communication method and a mobile station by which, in the case of using "ISR," the mobile station UE is enabled to execute a connection process with the "Default APN" when the mobile station UE moves back to an area in E-UTRAN from an area in the UTRAN and even when a connection between the mobile station UE and the "Default APN" is cut off while the mobile station UE is within the area in the UTRAN.

EMBODIMENT MODE FOR CARRYING OUT THE INVENTION (Mobile Communication System According to First Embodiment of the Invention)

With reference to FIGS. 1 to 4, a mobile communication system according to a first embodiment of the present invention is described.

The mobile communication system according to this embodiment includes both an E-UTRAN and a UTRAN. Moreover, the "ISR" described above is used in the mobile communication system according to this embodiment.

Figure 1:
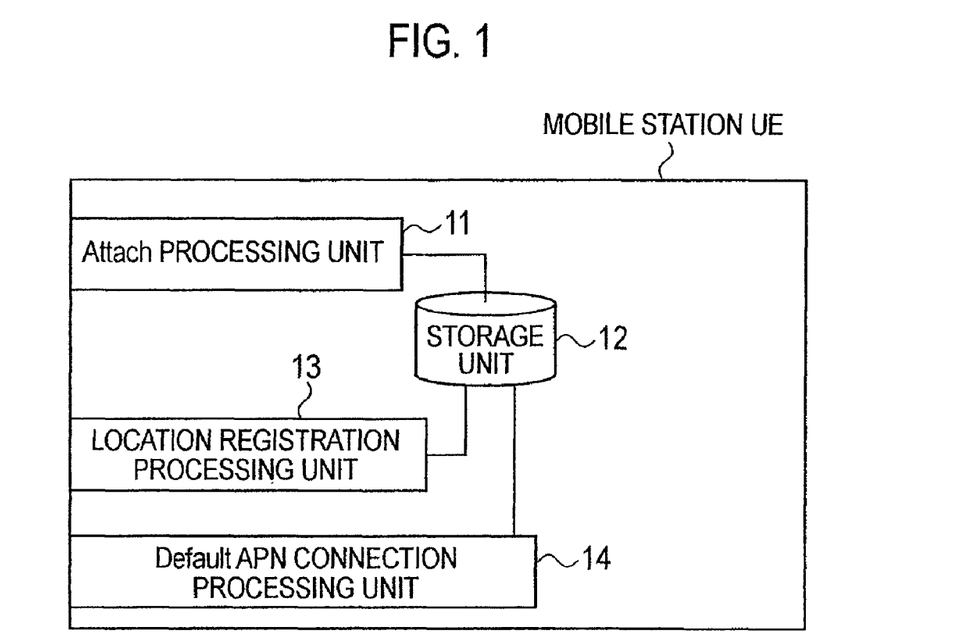
FIG. 1 is a functional block diagram of a mobile station according to a first embodiment of the present invention.

As shown in FIG. 1, a mobile station UE according to this embodiment includes an Attach processing unit 11, a storage unit 12, a location registration processing unit 13, and a Default APN connection processing unit 14.

The Attach processing unit 11 is configured to execute an Attach process to the E-UTRAN (a first network) or the UTRAN (a second network) when a certain trigger occurs, such as when the mobile station UE is turned on.

Figure 2:
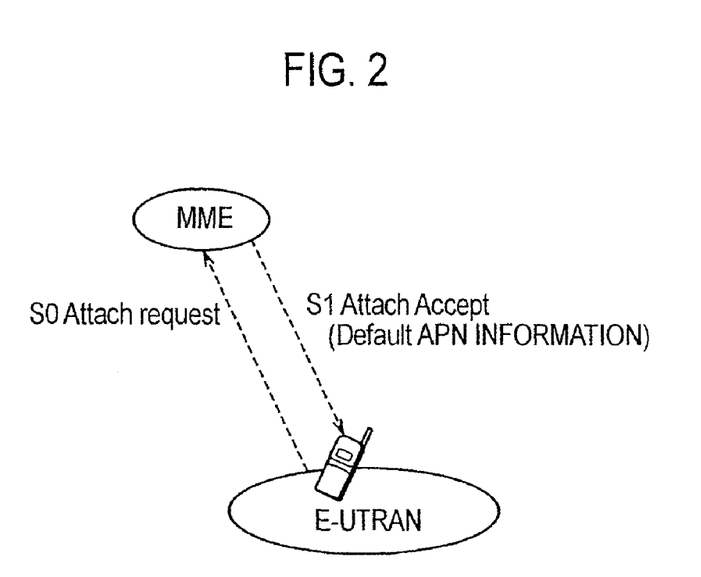
FIG. 2 is a diagram for explaining operations of the mobile station according to the first embodiment of the present invention.

For example, as shown in FIG. 2, when the mobile station UE is within an area in the E-UTRAN, the Attach processing unit is configured to transmit an "Attach request (Attach request)" to an E-UTRAN packet exchange MME in the event of a certain trigger (S0), and to receive an "Attach accept (Attach accept response)" from the E-UTRAN packet exchange MME (s1). Specifically, the "Attach accept" indicates that the Attach process by the mobile station UE has been accepted.

Note that it is assumed that a connection between the mobile station UE and a "Default APN (certain foreign network)" is established by the Attach process.

Further, the Attach processing unit 11 is configured to acquire "Default APN information (information on the certain foreign network)" through the "Attach accept" and to retain the acquired information in the storage unit 12.

Here, the "Default APN information (information on the certain foreign network)" may include identification information on each carrier and identification information on each foreign network. Note that the identification information on each foreign network can be freely set by each carrier.

The location registration processing unit 13 is configured to determine, when the mobile station UE moves to an E-UTRAN location registration area TA#2 (first area) in the E-UTRAN (first network) from a UTRAN location registration area RA#1 (second area) in the UTRAN (second network), whether or not a location registration process to the E-UTRAN (first network) needs to be executed, depending on whether or not the mobile station UE manages information on the E-UTRAN location registration area TA#2 (first area) (i.e., a TA list including the E-UTRAN location registration area TA#2).

Note that since the aforementioned method shown in FIG. 8 is used in this embodiment, the mobile station UE is configured as follows. Namely, in the case where the connection between the mobile station UE and the "Default APN" is cut off while the mobile station UE is in the area in the UTRAN, a location registration request is rejected by the E-UTRAN packet exchange MME, and the mobile station UE re-executes the Attach process when the mobile station UE moves back to the area in the E-UTRAN from the area in the UTRAN.

The Default APN connection processing unit 14 is configured to execute a connection process with the "Default APN (certain foreign network)."

Specifically, the Default APN connection processing unit 14 is configured to execute a connection process with the "Default APN (certain foreign network)" when no connection with the "Default APN (certain foreign network)" is established even if it is determined that no location registration process to the E-UTRAN (first network) needs to be executed when the mobile station UE moves to the E-UTRAN location registration area (first area) in the E-UTRAN (first network) from the UTRAN location registration area (second area) in the UTRAN (second network)).

To be more specific, the location registration processing unit 13 is configured to determine whether or not there is a connection with the "Default APN (certain foreign network)" by referring to the "Default APN information" and "SM (Session Management) Configuration."

For example, the "SM Configuration" is information stored in the storage unit 12, which includes an IP address assigned to the mobile station UE, bearer QoS, destination foreign network (APN) information, and the like. The "SM Configuration," however, does not include the "Default APN information (information on the certain foreign network)."

Therefore, the location registration processing unit 13 determines that there is no connection with the "Default APN (certain foreign network)" when a "Default APN (certain foreign network)" specified by the "Default APN information" stored in the storage unit 12 is not managed as the destination foreign network (APN) information in the "SM Configuration."

Figure 3:
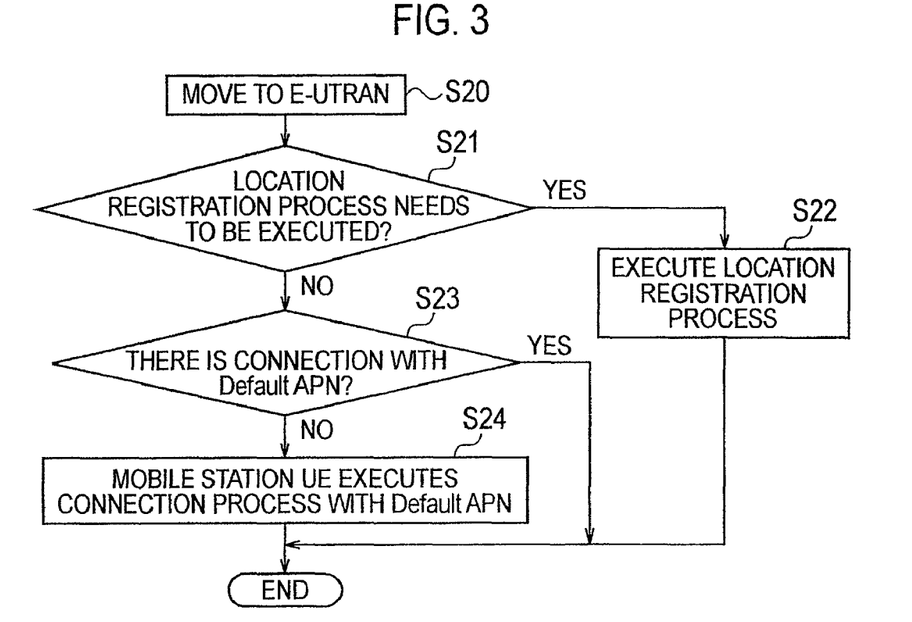
FIG. 3 is a flowchart showing operations of the mobile station according to the first embodiment of the present invention.
Figure 4:
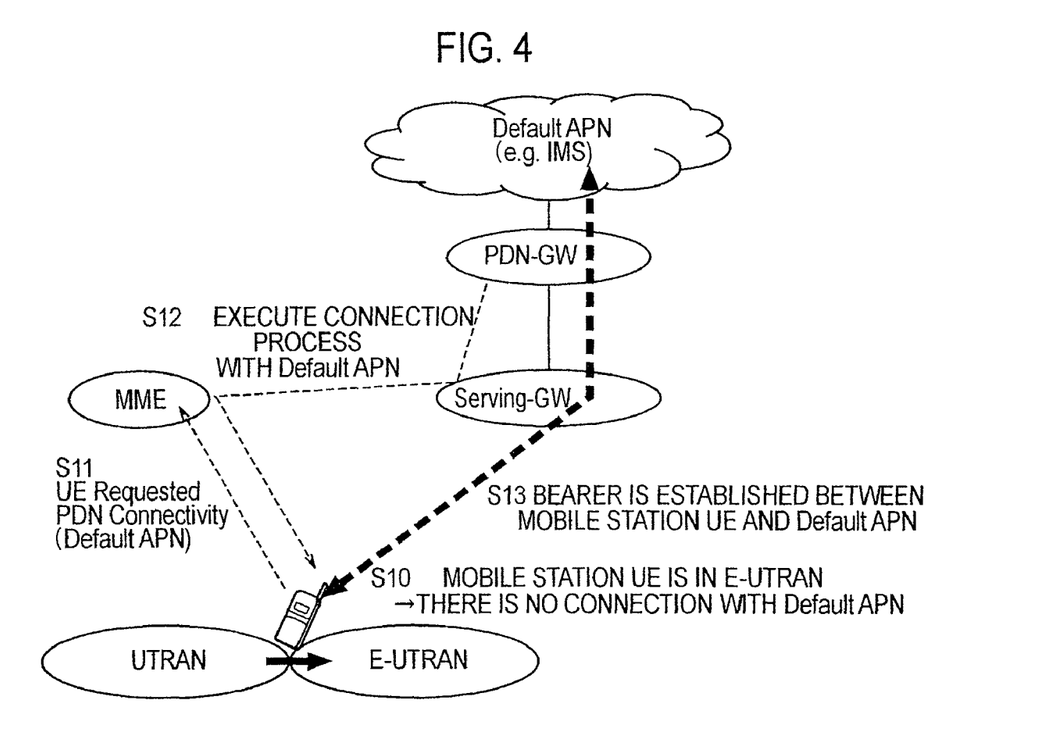
FIG. 4 is a diagram for explaining operations of the mobile station according to the first embodiment of the present invention.

With reference to FIGS. 3 and 4, operations of the mobile communication system according to the first embodiment of the present invention are described below.

As shown in FIG. 3, when it is detected in Step S20 that the mobile station UE moves to the E-UTRAN location registration area TA#2 from the UTRAN location registration area RA#1, the mobile station UE determines in Step S21 whether or not a location registration process to the E-UTRAN needs to be executed depending on whether or not the mobile station UE manages a TA list including the E-UTRAN location registration area TA#2.

When it is determined that the location registration process needs to be executed, the mobile station UE executes the location registration process to the E-UTRAN in Step S22.

On the other hand, when it is determined that the location registration process need not be executed, the mobile station UE determines in Step S23 whether or not there is a connection with a "Default APN (certain foreign network)."

When it is determined that there is a connection with a "Default APN (certain foreign network)," this operation is terminated.

On the other hand, when it is determined that there is no connection with a "Default APN (certain foreign network)," the mobile station UE executes a connection process with the "Default APN" in Step S24.

Specifically, as shown in FIG. 4, when it is detected in Step S10 that the mobile station UE moves to the E-UTRAN location registration area TA#2 and when it is determined that there is no connection with a "Default APN (certain foreign network)," the mobile station UE transmits a "UE Requested PDN Connectivity (Default APN)" to the E-UTRAN packet exchange MME in Step S11.

In Step S12, the mobile station UE executes a connection process with a "Default APN (e.g., IMS (IP Multimedia Subsystem))" in response to an instruction from the exchange MME. Then, in Step S13, a bearer is established between the mobile station UE and the "Default APN."

(Advantageous Effects of Mobile Communication System According to First Embodiment of the Invention)

In the mobile communication system according to the first embodiment of the present invention, the mobile station UE is configured to execute a connection process with the "Default APN" when the mobile station UE moves back to the area in the E-UTRAN from the area in the UTRAN, and when there is no connection between the mobile station UE and the "Default APN" even though no location registration process to the E-UTRAN needs to be executed.

Therefore, in the case of using "ISR," a mobile station UE can execute a connection process with a "Default APN" when the mobile station UE moves back to an area in E-UTRAN from an area in UTRAN and even when a connection between the mobile station UE and the "Default APN" is cut off while the mobile station UE is within the area in the UTRAN.

Modified Example

Incidentally, the operation of the above-mentioned the mobile station UE may be implemented by means of hardware, a software module executed by a processor, or a combination of both.

The software module may be provided in a storage medium in any format such as a RAM (Random Access Memory), a flash memory, a ROM (Read Only Memory), an EPROM (Erasable Programmable ROM), an EEPROM (Electronically Erasable and Programmable ROM), a register, a hard disk, a removable disk, or a CD-ROM.

The storage medium is connected to the processor so that the processor can read and write information from and to the storage medium. Moreover, the storage medium may be integrated into the processor. Additionally, the storage medium and the processor may be provided in an ASIC. The ASIC may be provided in the mobile station UE. Alternatively, the storage medium and the processor may be provided in the mobile station UE as a discrete component.

Hereinabove, the present invention has been described in detail using the above embodiments; however, it is apparent to those skilled in the art that the present invention is not limited to the embodiments described herein. Modifications and variations of the present invention can be made without departing from the spirit and scope of the present invention defined by the description of the scope of claims. Thus, what is described herein is for illustrative purpose, and has no intention whatsoever to limit the present invention.

The invention claimed is:

1. A mobile communication method by which, when moving to a first area in a first network from a second area in a second network, a mobile station determines whether or not a location registration process to the first network needs to be executed depending on whether or not the mobile station manages information on the first area, the method comprising the step of:

executing a connection process with a certain foreign network by the mobile station, when the mobile station moves to the first area from the second area, and when the mobile station determines that no connection with the certain foreign network is established even if determining that no location registration process to the first network needs to be executed.

2. The mobile communication method according to claim 1, wherein the mobile station acquires and retains information on the certain foreign network during an Attach process to the first network, and the mobile station determines whether or not there is a connection with the certain foreign network by referring to the information on the certain foreign network.

3. The mobile communication method according to claim 2, wherein the information on the certain foreign network includes identification information on each carrier and identification information on each foreign network.

4. A mobile station configured to determine, when moving to a first area in a first network from a second area in a second network, whether or not a location registration process to the first network needs to be executed depending on whether or not the mobile station manages information on the first area, the mobile station comprising:

a connection processing unit configured to execute a connection process with a certain foreign network when the mobile station moves to the first area from the second area and when the mobile station determines that no connection with the certain foreign network is established even if determining that no location registration process to the first network needs to be executed.

5. The mobile station according to claim 4, further comprising:

an Attach processing unit configured to acquire information on the certain foreign network during an Attach process to the first network, and to retain the acquired information in a storage unit, wherein the connection processing unit determines whether or not there is a connection with the certain foreign network by referring to the information on the certain foreign network in the storage unit.

6. The mobile station according to claim 5, wherein the information on the certain foreign network includes identification information on each carrier and identification information on each foreign network.

* * * * *